UNITED STATES PATENT OFFICE 2,184,794

MIXED ESTERS

Melvin De Groote, University City, Mo., assignor, by mesne assignments, to Petrolite Corporation, Ltd., a corporation of Delaware No Drawing. Application April 9, 1938,
Serial No. 201,187

16 Claims. (Cl. 260—400)

It is well known that maleic acid or its anhydride can be readily reacted with any suitable alcohol to produce a diesterified product of the following composition in which R indicates the alcohol residue:

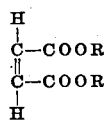

It is furthermore known that such neutral esters can be reacted with sodium bisulphite to produce the corresponding compound of the following composition:

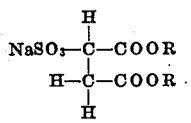

The present inventor jointly with Bernard Keiser in U. S. Patent #2,072,085 states that maleic acid may be esterified with any one of a number of alcohols or combinations of alcohols. It has been proposed to prepare mixed esters of a sulpho acid such as sulphosuccinic in which one carboxyl group unites with a high molecular alcohol as lauryl and stearyl, and another carboxyl group with a low molecular alcohol such as methyl or ethyl; also the mixed esters of comparable molecular weight, as for example mixed amyl octyl, mixed ethoxy ethylamyl have been suggested. A further series of mixed esters synthesized by reacting monohydric alcohol with a sulphodicarboxylic acid to get the acid ester and uniting this with one or more hydroxyls of a polyhydric alcohol especially to secure resin type products has also been suggested by Jaeger in U. S. Patent #2,028,091.

The present invention relates to new esters derived from sulphosuccinic acid by esterification of one carboxylic hydrogen atom by means of triricinolein, and the other carboxylic hydrogen atom by means of a polyhydric alcohol or its functional equivalent in such a manner that there is present at least one residual hydroxyl attached to the polyhydric alcohol residue; the ester is furthermore characterized by the fact that the sulfonic hydrogen atom is replaced by a metallic atom, an ammonium radical or an amine radical, including an alkylolamine radical. A peculiar combination with sulphodicarboxylic acids of two dissimilar alcohols presenting certain remarkable properties due to some unexpected cooperation between these dissimilar alcohol radicals has been achieved. A further part of present invention consists of the particular method or procedure employed in the synthesis thereof.

Materials of the kind described have various uses in the art. For instance they may be used as substitutes for soaps, Turkey red oils, sulphonated alcohols, and the like. They are particularly valuable as emulsifying agents, washing agents, dispersing agents, etc. One specific use is as demulsifying agents for crude oil emulsions of the water-in-oil type.

If castor oil or triricinolein is esterified with a mole of maleic until one carboxyl disappears, the composition of the product is as follows:

A 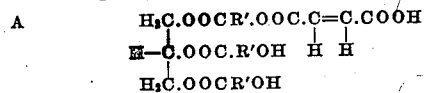

where R' designates the ricinoleic nucleus. If this product is then treated with a mole of glycerol, the composition then becomes as follows:

B 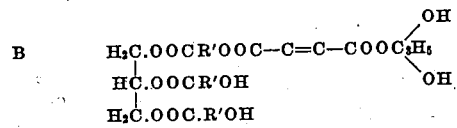

If this material is then treated with sodium bisulphite, for example, the resulting product becomes:

C 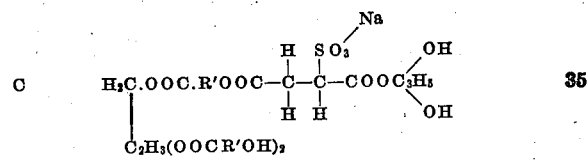

Naturally instead of using one mole of maleic anhydride, one could employ two moles of maleic anhydride, followed by the use of two moles of glycerol; or if desired, one could use three moles of maleic anhydride, followed by the use of three moles of glycerol. If two moles of maleic anhydride were used, one would necessarily employ two moles of sodium bisulfite or its equivalent. Similarly, if one employed three moles of maleic anhydride, one would employ three moles of sodium bisulfite or the like.

It has been a well-known practice to obtain products derived by reaction between castor oil, maleic anhydride, and sodium bisulfite. One well-known procedure is as follows:

2 mols. of castor oil are esterified with 3 mols. of maleic anhydride so as to form a neutral ester in which the six hydroxyl groups of the castor oil unite with the six hydroxyl groups of the maleic acid. This neutral ester is then treated with 3 mols. of sodium bisulphite to transform it into the corresponding sulpho-succinate.

Another well-known procedure is to follow the preceding example but to employ only one mole of castor oil instead of two. The former product obtained by treating two moles of castor oil with three moles of maleic anhydride is not readily soluble in water but can be rendered soluble by sulfonation with sulfuric acid. The last mentioned product which is obtained by replacing two moles of castor oil by one mole can be sulfonated with sulfuric acid or can be treated with caustic alkali to increase its water solubility.

There is a definite objection to either one of these two solubilizing procedures. In the first place, the difficulty in attempting to sulfonate the sulfo-succinic ester derived from castor oil so as to render it water soluble is best understood if one takes cognizance of the fact that the primary reactions and the secondary reactions which take place are identical with those which occur in the manufacture of Turkey red oil. If olive oil, which consists essentially of a triglyceride of oleic acid, or castor oil (triricinolein) is sulfonated as in the manufacture of Turkey red oil, then one obtains only about one third of the theoretical yield. This is stated clearly by Hart, Industrial & Engineering Chemistry, Analytical edition, volume 9, No. 4, 1937, in the following language:

"In the manufacture of the ordinary commercial grade of sulfonated oil, made from such oils as castor, olive, neat's-foot, etc., the raw oil is usually treated with about 25 per cent of strong sulfuric acid. In the case of glycerides whose fatty acids have either one double bond or one hydroxyl group, this quantity of acid corresponds approximately to 3 moles of sulfuric acid to 4 of the fatty acids. Actual sulfonation, however, occurs only to the extent of 25 to 30 per cent instead of the theoretical yield of about 75 per cent; hence, the ordinary sulfonated oil is a mixture of sulfonated fat, unchanged glycerides, free fatty acids, and polymerized oils."

However, Turkey red oils ordinarily contain substantially little or no combined glycerol, because the conventional washing process (i. e., the removal of the excess sulfuric acid used as a sulfonating agent by means of an aqueous wash) is essentially a hydrolytic or saponification process which hydrolyzes or decomposes the ester. Similarly, an attempt to sulfonate sulphosuccinic triricinolein esters in the manner previously proposed is unsatisfactory because of the low yield of compounds containing a sulfo fatty radical and because the ester is decomposed with the result that the bond between the sulfo-succinic acid residue and the ricinoleic acid residue or triricinolein residue is broken. The product obtained consists largely of sulfo-succinic acid, which is subsequently neutralized, and a fatty product which is more or less comparable to a conventional Turkey red oil.

Treatment with caustic alkali or the like is unsatisfactory because water solubility can only be increased at the expense of liberating a radical having the form —COONa or its equivalent. The presence of the radical —COONa means that the resistance of the product to precipitation with soluble calcium and magnesium salts is either eliminated entirely or greatly decreased. Such lowered resistance to soluble calcium and magnesium salts is an obvious disadvantage for many purposes. Such radical must be formed by breaking down either the ricinoleic acid ester, i. e., the bond connecting the ricinoleic acid radical with the glyceryl radical, or by liberating a sulfosuccinic acid radical and converting the same into the sodium salt, for example, by breaking down the bond between the sulfo-succinic acid salt and the alcoholiform hydroxyl radical, which is part of the ricinoleic acid radical. In either instance, it is evident that one no longer has present material of the kind described previously, but does have present something which, regardless of its nature, is entirely different.

As far as I am aware, the method employed in the manufacture of the type of chemical compounds herein disclosed is new at least to the extent that derivatives of triricinolein acid are concerned. In the manufacture of triricinolein sulphosuccinic acid esters, of the kind previously known and which esters required sulphonation or saponification with alkali to render them water soluble, it has been previously proposed to treat triricinolein with maleic anhydride in order to obtain a neutral ester. This is necessary because if one or more free carboxyl radicals derived from maleic anhydride remain, then such radicals are sufficiently acid so as to decompose the sodium bisulfite and prevent the sulfonation reaction.

However, the manufacturing procedure employed by me is different to the extent that I react the maleic anhydride in such a manner that only one carboxylic radical of the maleic acid residue is attached to the triricinolein radical or residue. In the second place, I recognize that the residual carboxyl radical must be neutralized before proceeding with the sulfonation process so as to prevent decomposition of the sodium bisulfite; and in the third place, I have found that if a polyhydric alcohol, and preferably glycerol, due to its relatively low cost and the presence of the three hydroxyls is employed, that one obtains a product of the kind indicated which is readily water soluble without being subjected to such objectionable procedures as sulfonation by sulfuric acid or saponification (treatment with alkali).

I consider the materials derived to be of decided economic value, and especially in view of the fact that the nearest substitute for triricinolein, i. e., an alcohol having at least eight carbon atoms such as octyl alcohol, is not obtainable except at a price of approximately five times as great as triricinolein. The procedure herein described results in a product or a composition of matter of such characteristics and properties that it overcomes various objections to, and limitations of the product previously described in the art as being obtained by esterification of triricinolein with maleic anhydride so as to produce a neutral ester and followed by subsequent sulfonation by means of sodium bisulfite or the equivalent. As previously pointed out, such product is not water soluble and apparently cannot be rendered water soluble except by conversion into some new compound or compounds of entirely different constitution, and having in turn new undesirable properties which more than offset the water solubility obtained.

My preferred reagent is prepared by treating one mole of triricinolein in the form of castor oil with two moles of maleic anhydride at a relatively low temperature, for instance, 140° C. or thereabouts, until one obtains a product having only one hydroxyl and having two free carboxylic radicals. Generally speaking, if the temperature of esterification is held reasonably low, one finds that when the product indicates the proper acid value (i. e., the existence of two free carboxyl radicals), it will automatically have the proper hydroxyl or acetyl value. Such product is then esterified with two moles of glycerol at approximately the same temperature until the acid value disappears completely and the product shows the proper acetyl or hydroxyl value. Needless to say, if the temperature is properly controlled and the previous ester has been suitably prepared, then when the acid value disappears completely, the product will have the proper hydroxyl or acetyl value.

This product is then treated in the conventional manner with two moles of sodium or ammonium bisulfite in the form of a concentrated solution and the reaction continued until there is no longer any free inorganic bisulfite present, or at the most only insignificant percentages, with the result that one obtains a material which is readily water soluble even in relatively small amounts, such as less than 1%. Needless to say, the reaction is not limited to sodium bi-sulfite, but one may employ any functional equivalent, for instance potassium bisulfite, amylamine bisulfite, ethanolamine bisulfite, diethanolamine bisulfite, triethanolamine bisulfite, morpholine bisulfite, cyclohexylamine bisulfite, benzylamine bisulfite, etc. One procedure commonly employed is to add a suitable basic material to the ester in such a manner as to prevent saponification and then pass in sulfur dioxide gas.

It is obvious that the radicals employed to replace the carboxylic hydrogen atom or atoms of maleic acid must contain at least one residual hydroxyl and preferably two. For this reason, it is evident that various other materials are the functional equivalent of glycerol. For instance, ethylene glycol, propylene glycol, diglycerol, triglycerol, polyglycerol, various glycols in which the ether linkage appears, such as diethylene glycol, etc. It is also obvious that glycerol chlorhydrin or some other similar chlorhydrin or some oxide such as glycidol, also would be the functional equivalent of glycerol.

Needless to say, maleic acid of course can replace maleic anhydride in the procedure previously described for manufacturing the new composition of matter herein contemplated. The same is also true of the corresponding acyl halide such as maleyl chloride. It is furthermore obvious that glycerol monomaleate or ethylene glycol monomaleate could be employed to act as a combined equivalent of both maleic anhydride and glycerol or maleic anhydride and ethylene glycol. Sulfosuccinic acid sodium salt if available could, of course, act as a substitute for both sodium bisulfite and maleic anhydride or maleic acid. Similarly, monoglyceryl ester of sulfosuccinic acid could be employed as a combined substitute for sodium bisulfite, maleic anhydride, and glycerol. The same is true of the ethylene glycol ester of sulfosuccinic acid. There may be other obvious equivalents which will be perfectly apparent to a skilled chemist, and no further elaboration is required. As far as the new chemical compounds or compositions of matter are concerned, which constitute the present invention, it is immaterial as to what particular procedure or method is employed to manufacture the same. It may be manufactured in the manner herein described or it may be manufactured by any suitable process.

In the hereto appended claims, it is understood that wherever an ionizable hydrogen atom of a sulfonic radical has been replaced by the metallic sodium atom, that ammonium radicals, amine radicals, other metallic atoms, etc., are the functional equivalents thereof. Similarly, in the appended claims where the glycerol radical or rather a dihydroxy propyl radical, appears, it is understood that any similar radical having at least one free hydroxyl, even though it be of an alkyl-oxy-alkyl nature (i. e., containing an ether linkage), rather than simply an alkyl radical, is also the functional equivalent thereof. Various radicals of this type have been enumerated previously.

In the hereto attached claims it is intended that the formula shall not be limited to any particular isomeric form. If the same product can exist in more than one isomeric form, it is understood that all such isomeric forms are included. For sake of convenience, triricinolein in the hereto attached claims is considered as being a trihydric alcohol of the composition:

$$(OH)_3(C_{17}H_{32}COO)_3C_3H_5$$

What I claim is:

1. An ester of the following composition:

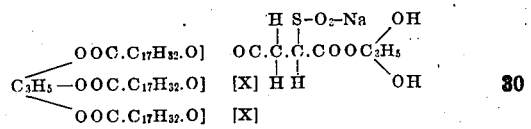

in which X and Y are selected from the group consisting of hydrogen atoms and

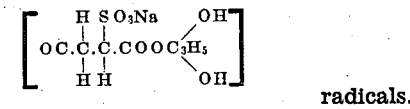

radicals.

2. An ester of the following composition:

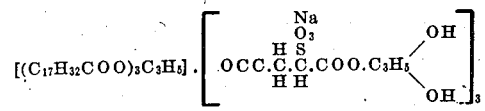

3. An ester of the following composition:

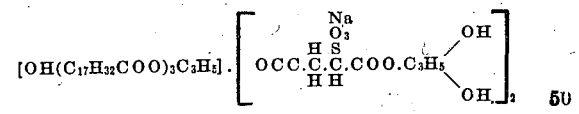

4. An ester of the following composition:

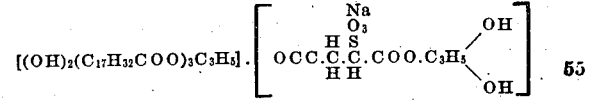

5. A water soluble ester of the following composition:

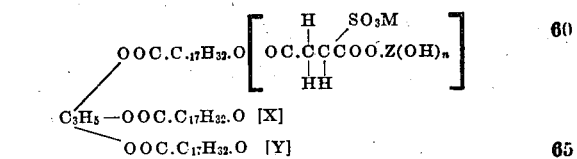

in which X and Y are selected from the group consisting of hydrogen atoms and

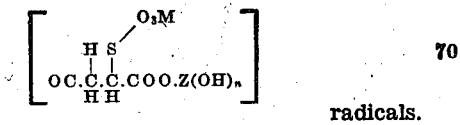

radicals.

and Z(OH)$_n$ is a polyhydric alcohol residue, and $n$ is a small whole number which is at least 1; and M is selected from the group consisting of a metallic atom, an ammonium radical and an amine radical.

6. An ester of the following composition:

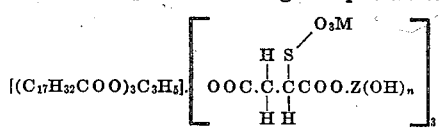

where M is a salt forming radical and Z(OH)$_n$ a polyhydric alcohol residue, and $n$ is a small whole number which is at least 1.

7. An ester of the following composition:

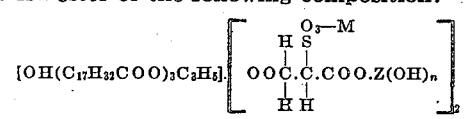

where M is a salt forming radical and Z(OH)$_n$ is a polyhydric alcohol residue; and $n$ is a small whole number which is at least 1.

8. An ester of the following composition:

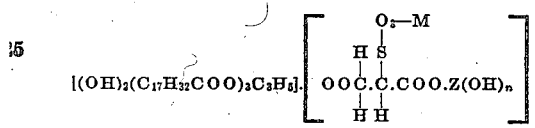

where M is a salt forming radical and Z(OH)$_n$ is a polyhydric alcohol residue; and $n$ is a small number which is at least 1.

9. A method of producing the mixed ester of the kind described in claim 1 which comprises reacting triricinolein with a compound containing a labile maleyl radical and selected from the class consisting of maleic acid, maleic anhydride and maleyl chloride to produce an ester, and in the molecular proportions calculated to give the corresponding acid ester and then reacting this resulting ester with glycerol in amounts which will produce the neutral ester, followed by sulfonation with a bisulphite.

10. A method of producing the mixed ester of the kind described in claim 2 which comprises reacting triricinolein with a compound containing a labile maleyl radical and selected from the class consisting of maleic acid, maleic anhydride and maleyl chloride to produce an ester, and in the ratio of 1 mole of triricinolein to 3 of the compound with the maleyl radical to get the acid ester containing no OH group, and then reacting this resulting ester with glycerol in amounts which will produce the neutral ester, followed by sulfonation with a bisulphite.

11. A method of producing the mixed ester of the kind described in claim 3 which comprises reacting triricinolein with a compound containing a labile maleyl radical and selected from the class consisting of maleic acid, maleic anhydride and maleyl chloride to produce an ester, and in the ratio of 1 mole of triricinolein to 2 of the compound with the maleyl radical to get the acid ester containing one OH group, and then reacting the resulting ester with glycerol in amounts which will produce the neutral ester, followed by sulfonation with a bisulphite.

12. A method of producing the mixed ester of the kind described in claim 4 which comprises reacting triricinolein with a compound containing a labile maleyl radical and selected from the class consisting of maleic acid, maleic anhydride and maleyl chloride to produce an ester, and in the ratio of 1 mole to 1 to get the acid ester containing two OH groups, and then reacting the resulting ester with glycerol in amounts which will produce the neutral ester, followed by sulfonation with a bisulphite.

13. A method of producing the mixed ester of the kind described in claim 5 which comprises reacting triricinolein with a compound containing a labile maleyl radical and selected from the class consisting of maleic acid, maleic anhydride and maleyl chloride to produce an ester, and in the molecular proportions calculated to give the corresponding acid ester and then reacting this resulting ester with a polyhydric alcohol which has less than 10 carbon atoms and in amounts which will produce the neutral ester, followed by sulfonation with a bisulfite.

14. A method of producing the mixed ester of the kind described in claim 6 which comprises reacting triricinolein with a compound containing a labile maleyl radical and selected from the class consisting of maleic acid, maleic anhydride and maleyl chloride to produce an ester and in the ratio of 1 mole of triricinolein to 3 of the compound with the maleyl radical to produce the acid ester containing no free OH group, and then reacting this resulting ester with a polyhydric alcohol which has less than 10 carbon atoms and in amounts which will produce the neutral ester, followed by sulfonation with a bisulfite.

15. A method of producing the mixed ester of the kind described in claim 7 which comprises reacting maleyl triricinolein with a compound containing a labile maleyl radical and selected from the class consisting of maleic acid, maleic anhydride and maleyl chloride to produce an ester and in the ratio of 1 mole of triricinolein to 2 of the compound with the maleyl radical to produce the acid ester containing no free OH group, and then reacting this resulting ester with a polyhydric alcohol which has less than 10 carbon atoms and in amounts which will produce the neutral ester, followed by sulfonation with a bisulfite.

16. The method of producing the mixed ester of the kind described in claim 8 which comprises reacting triricinolein with a compound containing a labile maleyl radical and selected from the class consisting of maleic acid, maleic anhydride and maleyl chloride to produce an ester and in the ratio of 1 mole of triricinolein to 1 mole of the compound with the maleyl radical to produce the acid ester containing no free OH group, and then reacting this resulting ester with a polyhydric alcohol which has less than 10 carbon atoms and in amounts which will produce the neutral ester, followed by sulfonation with a bisulfite.

MELVIN DE GROOTE.